C. SCHRAM.
COUPLING.
APPLICATION FILED OCT. 13, 1919.
1,369,304.
Patented Feb. 22, 1921.
2 SHEETS—SHEET 1.
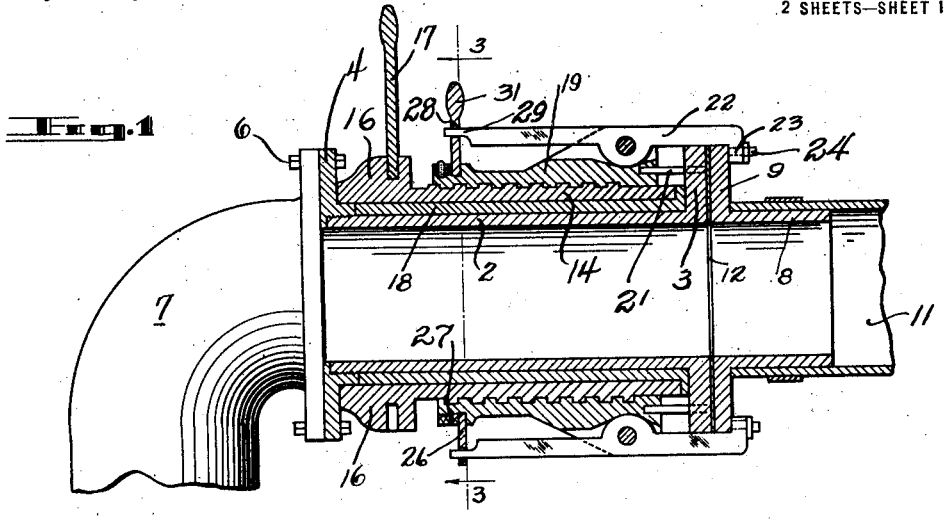
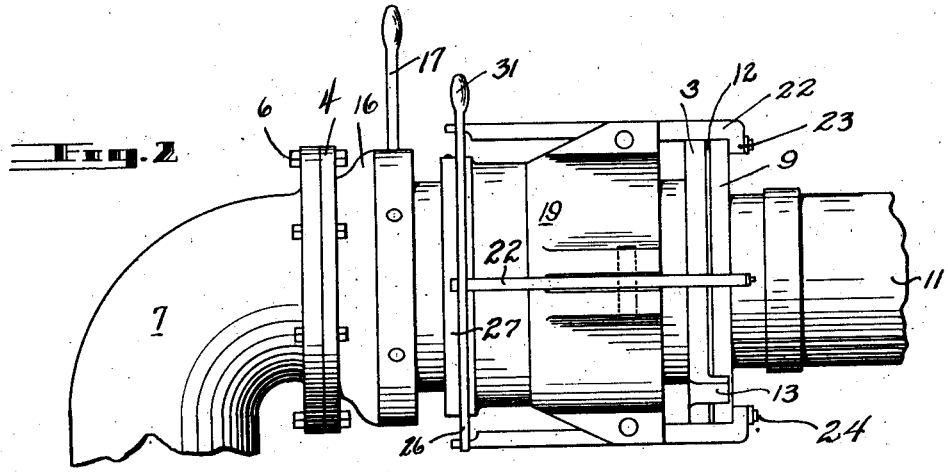
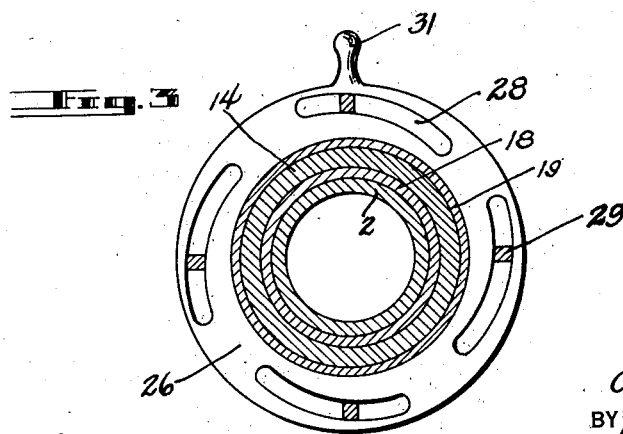
Witness
C. S. Evans
INVENTOR
Carl Schram
BY White & Prost
his ATTORNEYS.

C. SCHRAM.
COUPLING.
APPLICATION FILED OCT. 13, 1919.
1,369,304.
Patented Feb. 22, 1921.
2 SHEETS—SHEET 2.
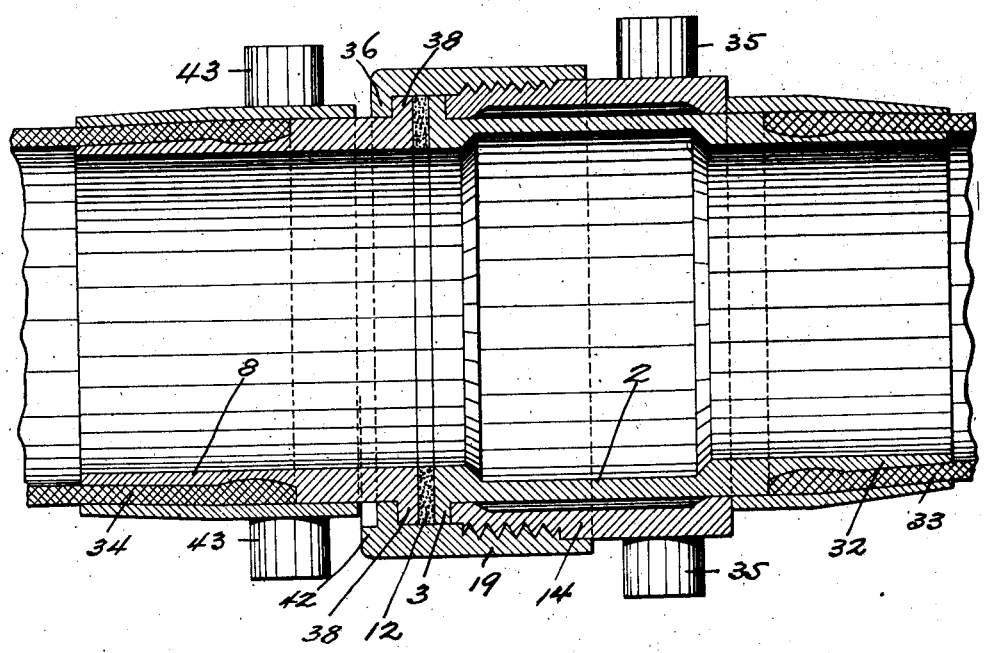
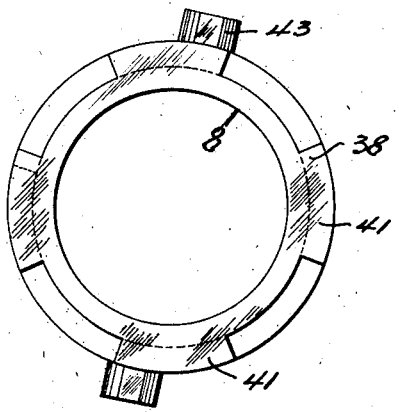
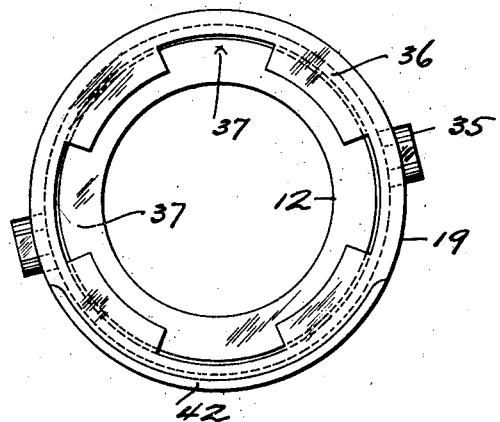
WITNESS:
H. A. Sherburne
INVENTOR.
CARL SCHRAM
BY White & Prost
his ATTORNEYS.

UNITED STATES PATENT OFFICE.

CARL SCHRAM, OF SAN FRANCISCO, CALIFORNIA.

COUPLING.

1,369,304.

Specification of Letters Patent.   Patented Feb. 22, 1921.

Application filed October 13, 1919.   Serial No. 330,350.

*To all whom it may concern:*

Be it known that I, CARL SCHRAM, a citizen of the United States, and a resident of the city and county of San Francisco and State of California, have invented a new and useful Coupling, of which the following is a specification.

My invention relates to rapidly operable means for joining two conduits.

An object of the invention is to provide a coupling with which two conduits may be quickly attached or detached, with particular reference to the need for such a device in connection with the transfer of oil from one vessel to another or from a pier to a vessel, or vice versa, and to the connection of hose.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a vertical sectional view, taken longitudinally through the coupling of my invention.

Fig. 2 is a side elevation of the coupling.

Fig. 3 is a transverse vertical section taken in the plan indicated by the line 3—3 of Fig. 1.

Fig. 4 is a vertical longitudinal section of a modified form of coupling, particularly adapted for connecting lengths of hose.

Fig. 5 is an end view of one portion of the uncoupled coupling.

Fig. 6 is an end view of the coacting end of the other portion of the uncoupled coupling.

When oil is being taken aboard ship it is frequently necessary to disconnect the conduit in a hurry. Since with the devices now in use, as long as twenty minutes is often required to disconnect the couplings, recourse to a hatchet for severing the hose is not an infrequent occurrence. Furthermore, present devices are relatively very costly. It is therefore primarily to support this need and to provide a coupling which may be quickly separated that I have invented the coupling described herein.

Referring chiefly to Fig. 1, the coupling comprises a pipe 2 provided with an integral flange 3 on one end. The opposite end is provided with a flange 4 threaded into rigid engagement therewith. Bolts 6 through the flange 4 connect the pipe 2 and associated parts to the fixed pipe 7 which is connected preferably to the reservoir or receiving line on the vessel taking on the oil. A pipe 8 provided with the integral flange 9 is connected by flexible conduit 11 preferably to the discharge line from the reservoir being emptied. The flange 9 is adapted to be seated against the flange 3, a suitable packing or washer 12 being preferably interposed between the two flanges, so that a continuous conduit is formed between discharging and receiving lines. Preferably two lugs 13 are arranged on the lower side of flange 3 to facilitate the rapid placing of the flange 9 in properly alined position.

Means are provided for securing the two flanges together and for clamping them into tight engagement. A threaded sleeve 14 provided with the hub or flange 16 is revolubly mounted on the pipe 2, bearing at the ends against the flanges 4 and 3. The sleeve may be turned on the pipe by means of a spike 17 set in apertures formed in the hub. If desired a bearing bushing 18 may be interposed between the sleeve 14 and the pipe. Threaded upon the sleeve 14 is a second sleeve 19 prevented from rotary movement relative to the pipe by pins 21 fixed in the flange 3 and engaging in recesses in the end of the sleeve 19. Obviously then rotation of the sleeve 14 will produce longitudinal or axial movement of the sleeve 19. Pivotally mounted upon the sleeve 19 are a plurality of latches 22 the hooked ends 23 of which are adapted by the pivotal movement of the latches to be moved radially into and out of engagement with the flange 9 when that flange is positioned against the flange 3. Set screw 24 in each hook 23 provide means for insuring a bearing against the flange.

Means are provided for coördinating the movement of all of the latches and for moving them together. Journaled upon the sleeve 19 is a disk or plate 26, held thereon by the collar 27. The disk is provided with spirally disposed slots 28 in which the ends 29 of the latches are engaged. The parts are so proportioned that rotation of the disk by its handle 31, through an arc of about 60° imparts a pivotal motion to the latches sufficient to seat the hooks 23 behind the flange 9 or raise them clear, to permit the removal of the flange 9, as the case may be.

Operation: When it is desired to effect a union of the two conduits, the sleeve 14 is turned by the handle 17 to throw the sleeve 19 and the latches forward, and the disk 26 is turned to move the hooked ends of the latches outwardly. The flange 9 is then seated on the lugs 13 against the flange 3, and the disk 26 is turned to seat the hooked ends of the latches behind it. The handle 17 is then turned to retract the sleeve 19, thus forcing the hooks tightly against the flange 9 and clamping that flange to the flange 3. The coupling is disconnected by contrary movement of handles 17 and 31 in the order named, when the flange 9 may be lifted clear.

In the hose coupling form of the apparatus shown in Figs. 4, 5 and 6, the pipe 2 is formed at its end 32 to clamp the end of the hose 33 and the pipe 8 is similarly formed to clamp the end of another hose length 34. The sleeve 14 is provided with buttons 35 for engagement with a spanner for rotating the sleeve on the pipe. The sleeve 19, instead of being provided with latches 22 which hook over the flange on the pipe 8 is provided with an inturned flange 36, provided on its inner periphery with a plurality of regularly spaced sector shaped depressions or apertures 37. The flange 38 on the end of pipe 8 is provided with a plurality of regularly spaced sector shaped lugs 41 adapted to pass through the apertures 37, so that a relative movement of one flange with respect to the other moves the lugs 41 into position behind the flange elements 36. Stops on the lugs 41 stop the relative movement of the lugs and flange elements when they are in full engagement. A curved lip 42 on the lower part of the flange 36 serves as a guide or support for the lugs 41 in coupling the members together. The pipe 8 is also provided with buttons 43 for engagement with a spanner. This coupling is operated substantially the same as that shown in Fig. 1, the sleeve 14 being turned after the pipe flanges have been brought together, to pull the sleeve 19 backward and clamp the flanges.

I claim:

1. A coupling comprising two pipes, means pivotally arranged on one pipe for releasably engaging the other pipe, and means for retracting said pivoted means to clamp said pipes together.

2. A coupling comprising a pipe, a flanged pipe adapted to be alined with the first pipe, means pivotally arranged on the first pipe for releasably engaging the flange of the second pipe, and means for retracting said pivoted means to clamp said pipes together.

3. A coupling comprising two pipes, a sleeve rotatably disposed on one of said pipes, a second sleeve in threaded engagement with said first sleeve, means disposed between said second sleeve and the pipe therein for preventing relative rotation therebetween, and means pivotally mounted on said second sleeve for releasably engaging the other of said pipes.

4. A coupling comprising two pipes, a sleeve rotatably disposed on one of said pipes, a second sleeve in threaded engagement with said first sleeve, means disposed between said second sleeve and the pipe therein for preventing relative rotation therebetween, latches pivoted on said second sleeve for releasably engaging the other of said pipes, and means for operating said latches simultaneously.

5. A coupling comprising two pipes, a sleeve rotatably disposed on one of said pipes, a second sleeve in threaded engagement with said first sleeve, means disposed between said second sleeve and the pipe therein for preventing relative rotation therebetween, latches pivoted on said second sleeve for releasably engaging the other of said pipes and a rotatably mounted disk for operating said latches simultaneously.

6. A coupling comprising two pipes, a sleeve rotatably disposed on one of said pipes, a second sleeve in threaded engagement with said first sleeve, means disposed between said second sleeve and the pipe therein for preventing relative rotation therebetween, latches pivoted on said second sleeve for releasably engaging the other of said pipes, and a disk rotatably mounted on said second sleeve and provided with spirally disposed slots in which said latches are engaged.

7. A coupling comprising two pipes, a sleeve rotatably disposed on one of said pipes, a second sleeve in threaded engagement with said first sleeve, means disposed between said second sleeve and the pipe therein for preventing relative rotation therebetween, latches pivoted on said second sleeve for releasably engaging the other of said pipes, and a disk rotatably mounted on one of said parts and provided with spirally disposed slots in which said latches are engaged.

In testimony whereof, I have hereunto set my hand at Linnton, Oregon, this 13th day of September, 1919.

CARL SCHRAM.

In presence of—
A. A. SAWYER,
J. B. SCHAEFER.